(12) United States Patent
Liu

(10) Patent No.: US 8,938,656 B2
(45) Date of Patent: Jan. 20, 2015

(54) DATA STORAGE DEVICE WITH INTERMEDIATE ECC STAGE

(75) Inventor: Tao Liu, Santa Clara, CA (US)

(73) Assignee: Sandisk Technologies Inc., Plano, TX (US)

( * ) Notice: Subject to any disclaimer, the term of this patent is extended or adjusted under 35 U.S.C. 154(b) by 200 days.

(21) Appl. No.: 13/618,313

(22) Filed: Sep. 14, 2012

(65) Prior Publication Data

US 2014/0082456 A1   Mar. 20, 2014

(51) Int. Cl.
*G11C 29/00*   (2006.01)

(52) U.S. Cl.
USPC .......................................................... 714/763

(58) Field of Classification Search
CPC ....... H04L 1/007; H04L 1/0065; H04L 1/006; H04L 1/0057; G06F 11/1068; G06F 11/1072; H03M 13/29; H03M 13/3776; H03M 13/2942; H03M 13/2945; G11C 16/10; G11C 2029/0411
See application file for complete search history.

(56) References Cited

U.S. PATENT DOCUMENTS

| 7,631,245 | B2 | 12/2009 | Lasser |
| 8,006,171 | B2 * | 8/2011 | Wang ............................ 714/782 |
| 8,145,868 | B2 | 3/2012 | Coteus et al. |
| 8,495,442 | B1 * | 7/2013 | Sutardja et al. ............... 714/723 |
| 8,683,274 | B1 * | 3/2014 | Varnica et al. ................ 714/704 |
| 2007/0268905 | A1 | 11/2007 | Baker et al. |
| 2010/0131831 | A1 * | 5/2010 | Weingarten et al. ......... 714/782 |
| 2011/0161554 | A1 | 6/2011 | Selinger et al. |
| 2012/0204082 | A1 * | 8/2012 | Shen et al. ..................... 714/800 |
| 2012/0233518 | A1 * | 9/2012 | Lee et al. ....................... 714/755 |

* cited by examiner

*Primary Examiner* — Guerrier Merant
(74) *Attorney, Agent, or Firm* — Toler Law Group, PC

(57) ABSTRACT

A data storage device includes a non-volatile memory and a controller including a first error correction coding (ECC) engine configured to generate a first codeword corresponding to data to be stored at the non-volatile memory. The data storage device also includes a second ECC engine coupled to the controller and to the non-volatile memory. The second ECC engine is configured to receive a representation of the first codeword from the controller and to perform a decode operation of the representation of the first codeword to correct transmission errors prior to storage of the data in the non-volatile memory.

21 Claims, 3 Drawing Sheets

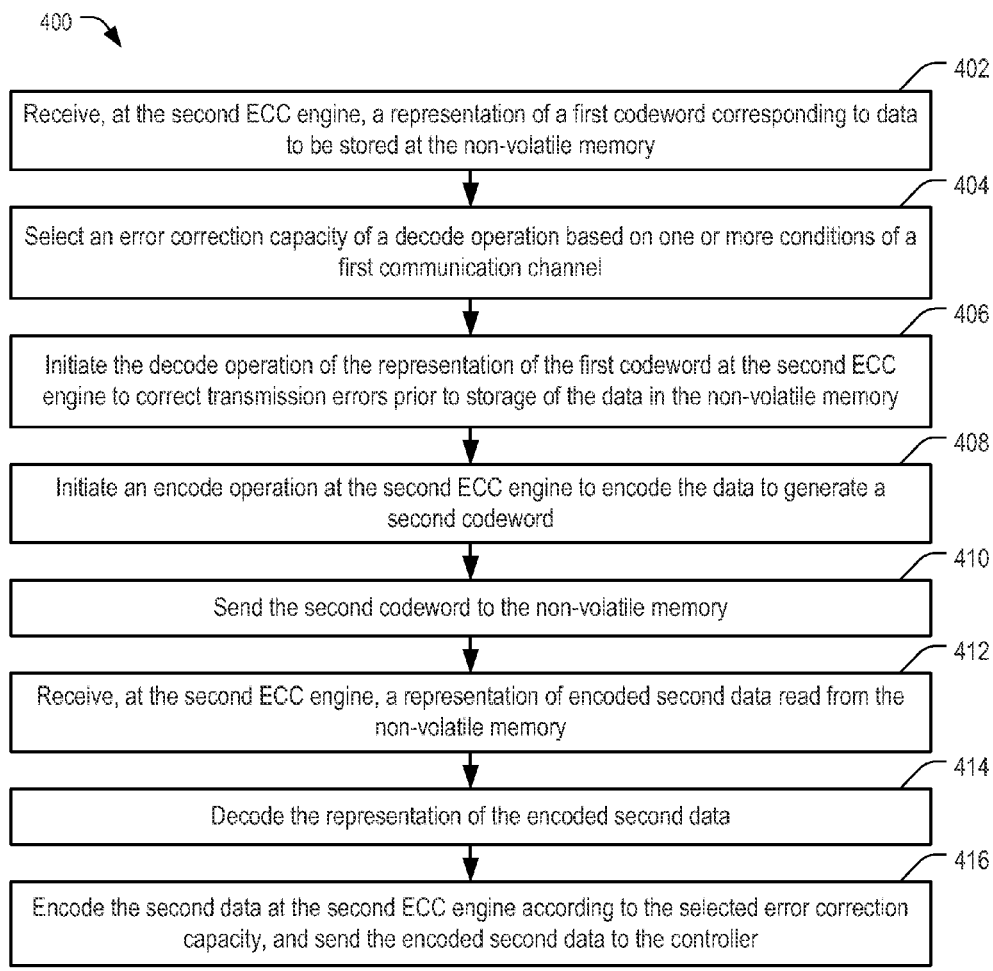

DATA STORAGE DEVICE WITH INTERMEDIATE ECC STAGE

FIELD OF THE DISCLOSURE

The present disclosure is generally related to error correction coding (ECC) in data storage devices.

BACKGROUND

Non-volatile data storage devices, such as universal serial bus (USB) flash memory devices or removable storage cards, have allowed for increased portability of data and software applications. Flash memory devices can enhance data storage density by storing multiple bits in each flash memory cell. For example, Multi-Level Cell (MLC) flash memory devices provide increased storage density by storing 3 bits per cell, 4 bits per cell, or more. Although increasing the number of bits per cell and reducing device feature dimensions may increase a storage density of a memory device, a bit error rate of data stored at the memory device may also increase.

Error correction coding (ECC) is often used to correct errors that occur in data read from a memory device. Prior to storage, data may be encoded by an ECC encoder to generate redundant information (e.g. "parity bits") that may be stored with the data as an ECC codeword. As more parity bits are used, an error correction capacity of the ECC increases and a number of bits required to store the encoded data also increases.

As data transfer speeds increase between components within a data storage device, such as on a bus between a memory controller and a flash memory, a possibility of errors occurring in data during transmission between components may also increase. To accommodate a larger potential number of errors in data due to an increase in such transmission errors, a larger error correction capacity of the ECC may be used. However, providing a larger error correction capacity at an ECC engine may increase a decoding latency and a power consumption of the ECC engine. Use of a larger number of parity bits to provide increased error correction capacity may increase a latency due to longer codewords transferred between components within the data storage device and may reduce an overall storage capacity of the memory device as more parity bits are stored for each codeword. Because transmission errors may be caused by different mechanism than storage errors, using a same large error correction code for both transmission errors and for storage errors may introduce inefficiencies.

SUMMARY

A data storage device includes a first ECC engine in a controller and a second ECC engine that is coupled to a non-volatile memory. The second ECC engine enables correction of errors arising during transmission of data from the controller to the non-volatile memory prior to storage of the data at the non-volatile memory. An error correction capacity of the second ECC engine may be adjustable based on a number of errors detected during transmission of data between the controller and the second ECC engine.

BRIEF DESCRIPTION OF THE DRAWINGS

FIG. 3 is a flow chart of a first particular embodiment of operation of the second ECC engine of FIG. 1;

FIG. 4 is a flow chart of a second particular embodiment of operation of the second ECC engine of FIG. 1.

DETAILED DESCRIPTION

Figure 1:
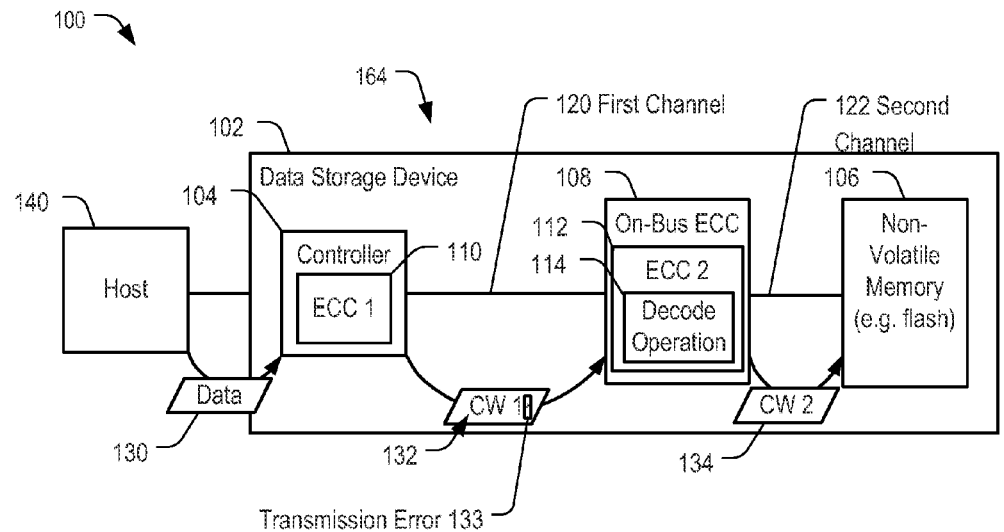
FIG. 1 is a block diagram illustrating a particular embodiment of a system including a data storage device including a first ECC engine at a controller and a second ECC engine configured to correct transmission errors in data received from the controller.

Referring to FIG. 1, a first particular embodiment of a system 100 includes a host device 140 coupled to a data storage device 102. The data storage device 102 includes a controller 104 coupled to an on-bus error correction coding (ECC) module 108. The on-bus ECC module 108 is coupled to a non-volatile memory 106. The on-bus ECC module 108 includes a second ECC engine (ECC 2) 112 that is configured to perform a decode operation 114 on encoded data received as a first codeword 132 from a first ECC engine 110 (ECC 1) of the controller 104. By performing the decode operation 114 after receiving the first codeword 132 from the controller 104, one or more transmission errors occurring during transmission via a first communication channel 120 (e.g. a bus) may be corrected prior to storage of encoded data to the non-volatile memory 106.

The host device 140 may be configured to provide data, such as data 130, to be stored at the non-volatile memory 106 or to request data to be read from the non-volatile memory 106. For example, the host device 140 may include a mobile telephone, a music or video player, a gaming console, an electronic book reader, a personal digital assistant (PDA), a computer, such as a laptop computer, a notebook computer, or a tablet, any other electronic device, or any combination thereof.

The data storage device 102 includes the controller 104 coupled to the on-bus ECC module 108 via the first communication channel 120. The on-bus ECC module 108 is coupled to the non-volatile memory 106 via a second communication channel 122. The non-volatile memory 106 may be a NAND flash memory. The non-volatile memory 106 may include one or more groups of storage elements, such as a word line of a multi-level cell (MLC) flash memory. For example, the data storage device 102 may be a memory card, such as a Secure Digital SD® card, a microSD® card, a MiniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). As another example, the data storage device 102 may be configured to be coupled to the host device 140 as embedded memory, such as eMMC® (trademark of JEDEC Solid State Technology Association, Arlington, Va.) and eSD, as illustrative examples.

The controller 104 is configured to receive data and instructions from and to send data to the host device 140 while the data storage device 102 is operatively coupled to the host device 140. The controller 104 is further configured to send data and commands to the non-volatile memory 106 via the on-bus ECC module 108 and to receive data from the non-volatile memory 106 via the on-bus ECC module 108. For example, the controller 104 is configured to send data and a write command to instruct the non-volatile memory 106 to store the data to a specified address. As another example, the controller 104 is configured to send a read command to read data from a specified address of the non-volatile memory 106.

The first ECC engine 110 may be configured to use a first ECC scheme having a first error correction capability. For example, the first error correction capability may be sufficient to enable recovery of data at the second ECC engine 112 after one or more errors occur during transmission via the first channel 120, but the first error correction capability of the first ECC engine 110 may be insufficient to perform full error correction of errors that may occur during storage of data at the non-volatile memory 106. For example, the first ECC engine 110 may include an encoder configured to encode data using an ECC encoding scheme, such as a Reed Solomon encoder, a Bose-Chaudhuri-Hocquenghem (BCH) encoder, a low-density parity check (LDPC) encoder, a Turbo Code encoder, an encoder configured to encode one or more other ECC encoding schemes, or any combination thereof. The first ECC engine 110 may include a decoder configured to decode data received from the second ECC engine 112 to detect and correct, up to an error correction capability of the ECC scheme, any bit errors that may be present in the data.

The on-bus ECC module 108 may be included in a semiconductor die that is distinct from a die that includes the controller 104 and that is also distinct from one or more dies that include the non-volatile memory 106. For example, the controller 104, the on-bus ECC module 108, and the non-volatile memory 106 may each occur on a distinct die that may be included in a package as a stack of dies or may be included as one or more dies coupled to a printed circuit board (PCB) within the data storage device 102.

Communication of data from the controller 104 to the on-bus ECC module 108 is performed via the first communication channel 120 and may result in one or more transmission errors, e.g. a bit may be received as having a different value than the bit's transmitted value. For example, as bit transfer speed via the first communication channel 120 increases, a likelihood of transmission errors may increase. Similarly, one or more other factors such as device temperature may influence a number of transmission errors that may occur during transmission from the controller 104 to the on-bus ECC module 108. In contrast to the first communication channel 120, the second communication channel 122 may be shorter and may introduce comparatively few (e.g. zero) transmission errors.

The second ECC engine 112 is configured to perform the decode operation 114 to enable correction of errors that may occur during transmission via the first communication channel 120. The second ECC engine 112 is configured to receive encoded data, such as a representation of the first codeword 132. The representation of the first codeword 132 may correspond to an ECC codeword generated at the first ECC engine 110 and may include one or more incorrect bits, illustrated as a representative transmission error 133. The decode operation 114 that is initiated at the second ECC engine 112 may be configured to use a first ECC scheme having the first error correction capability. For example, the second ECC engine 112 may include one or more decoders configured to decode data received from the first ECC engine 110 or from the non-volatile memory 106 to detect and correct, up to an error correction capability of the applicable ECC scheme, any bit errors that may be present in the data. The one or more decoders of the second ECC engine 112 may include a Reed Solomon decoder, a Bose-Chaudhuri-Hocquenghem (BCH) decoder, a low-density parity check (LDPC) decoder, a Turbo Code decoder, a decoder configured to decode one or more other ECC encoding schemes, or any combination thereof.

The second ECC engine 112 is configured to generate a second codeword 134 that is sent via the second communication channel 122 to the non-volatile memory 106 for storage. In a first implementation, the second codeword 134 may be generated by re-encoding the data resulting from the decode operation 114 using a second ECC scheme having a second error correction capability that is larger than the first error correction capability. For example, the second ECC engine 112 may include an encoder configured to encode data using an ECC encoding scheme, such as a Reed Solomon encoder, a Bose-Chaudhuri-Hocquenghem (BCH) encoder, a low-density parity check (LDPC) encoder, a Turbo Code encoder, an encoder configured to encode one or more other ECC encoding schemes, or any combination thereof. The first ECC scheme used by the first ECC engine 110 and the second ECC scheme used by the second ECC engine 112 may be the same (e.g. BCH) or may be different (e.g. Reed Solomon and LDPC, respectively).

In a second implementation, the second ECC engine 112 may be configured to generate an error corrected version of the representation of the first codeword 132. The first codeword 132 and the second codeword 134 may correspond to the same codeword. In the second implementation, the second ECC engine 112 may not include an encoder.

The second ECC engine 112 may further be configured to receive encoded data that is read from the non-volatile memory 106 via the second communication channel 122. The second ECC engine 112 may be configured to perform ECC error correction of the encoded second data received from the non-volatile memory 106 and to provide encoded data to the controller 104 via the first communication channel 120. In the first implementation, the second ECC engine 112 may re-encode the decoded second data prior to sending the re-encoded second data to the controller 104. In the second implementation, the second ECC engine 112 may generate an error-corrected version of the encoded second data that is sent to the controller 104 without performing an encode operation at the second ECC engine 112.

During operation, the host device 140 may provide the data 130 to the data storage device 102 for storage in the non-volatile memory 106. The first ECC engine 110 in the controller 104 may perform an ECC encoding operation to generate the first codeword 132. The first codeword 132 is sent via the first communication channel 120 to the on-bus ECC module 108. The second ECC engine 112 performs the decode operation 114 and may re-encode a result of the decode operation 114 or may generate an error corrected version of the representation of the first codeword 132 to provide the second codeword 134 to the non-volatile memory 106.

In the first implementation, during a data write operation the first codeword 132 is generated according to a first ECC scheme that has a first error correction capability. The second codeword 134 is generated according to a second ECC scheme having a second error correction capability that is greater than the first error correction capability. To illustrate, the first codeword 132 may include a sufficient number of parity bits to enable correction of a predicted number of transmission errors 133 that may be introduced during transmission via the first communication channel 120. The second ECC engine 112 is configured to decode the representation of the first codeword 132 to retrieve the data 130 and to generate the second codeword 134 by re-encoding the data 130 according to a second ECC scheme. The second codeword 134 may include a larger number of parity bits than the first codeword 132 based on a larger expected number of errors that may occur during storage in the non-volatile memory 106.

During a data read operation according to the first implementation, the second ECC engine 112 may be configured to receive a representation of the second codeword 134 from the non-volatile memory 106 and may perform a decode operation using an ECC scheme having the second correction capability (i.e. a full correction capability for correction of errors occurring during storage). The second ECC engine 112 may re-encode the decoded data according to the first ECC scheme (i.e. a reduced correction capability for transmission errors) to generate the first codeword 132 for transmission via the first communication channel 120 to the controller 104. One or more errors may occur during transmission to the controller 104, which may be corrected by the first ECC engine 110 prior to being provided to the host device 140.

According to the first implementation, the first codeword 132 used for data transfer between the controller 104 and the on-bus ECC module 108 has fewer parity bits than the second codeword 134 used for data storage at the non-volatile memory 106. Fewer bits are transferred via the first communication channel 120 as compared to systems where a memory controller encodes a codeword large enough for both storage in a non-volatile memory and transmission error correction purposes. As a result, data transfer time via the first communication channel may be reduced.

In the second implementation, during a data write operation the first codeword 132 is generated according to the second ECC scheme (i.e. having the second correction capability that is sufficient to correct for an expected number of errors that may occur during storage in the non-volatile memory 106). The decode operation 114 decodes the representation of the first codeword 132 using a first error correction capability that is less than the second error correction capability but large enough for transmission error correction purposes. To illustrate, the decode operation 114 may apply an ECC decoding scheme sufficient to correct a number of errors that may be predicted to occur via communication over the first communication channel 120 and to generate an error-corrected version of the first codeword 132. In this implementation, the second codeword 134 may be the same as the first codeword 132 after correction of the one or more transmission errors 133.

During a data read operation according to the second implementation, the second ECC engine 112 may be configured to receive a representation of the second codeword 134 from the non-volatile memory 106 and may perform a decode operation using the second ECC scheme having the second error correction capability (i.e. a full correction capability for correction of errors occurring during storage). The second ECC engine 112 is configured to generate an error-corrected version of the second codeword 134 received from the non-volatile memory 106 for transmission via the first communication channel 120 to the controller 104. One or more errors may occur during transmission to the controller 104 and may be corrected by the first ECC engine 110 prior to being provided to the host device 140. In this second implementation, more bits are transmitted between the controller 104 and the second ECC engine 112 via the first channel 120 than in the first implementation, but second ECC engine 112 does not re-encode data as it does in the first implementation. As compared to traditional one-stage-ECC scheme, the second implementation may reduce the possibility of having uncorrectable ECC (i.e. a number of errors that exceeds an error correction capacity of an ECC scheme).

According to the second implementation, the second ECC engine 112 may perform no ECC encoding. A single encoding of data is performed by the first ECC engine 110. Decoding at the second ECC engine 112 uses the second ECC scheme (for transmission error correction) during a data write operation and uses the first ECC scheme (for storage error correction) during a data read operation. As a result, the controller 104 is relieved of performing the more computationally intensive storage error correction, and may implement a single encoding scheme, which may reduce a cost and/or a size of the controller 104 and may free processing resources at the controller 104 for other operations.

The on-bus ECC module 108 may be manufactured as a standalone module and may be integrated into existing memory system designs at relatively low cost and with a shorter design cycle as compared to modifying existing controllers. As an example, the on-bus ECC module 108 may be used with a conventional controller to provide improved ECC capability (e.g. in the first implementation) for storage of data to the non-volatile memory 106. The on-bus ECC module 108 may be used with various controller and memory combinations and may be shared among multiple memory devices (e.g., multiple flash memory dies). The on-bus ECC module 108 may be implemented into existing system architectures without modification to existing controllers and non-volatile memories. For example, the on-bus ECC module 108 may relay control signals and responses between the controller 104 and the non-volatile memory 106 so that the controller 104 may operate as if it were communicating directly with the non-volatile memory 106, as described in further detail with respect to FIG. 2.

Figure 2:
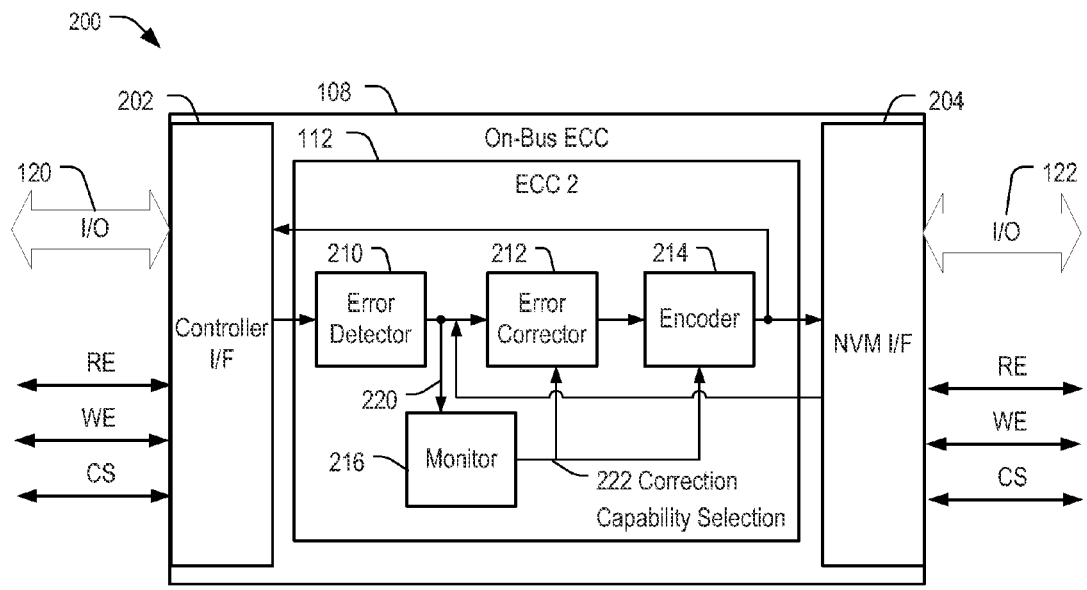
FIG. 2 is a block diagram illustrating a particular embodiment of a system including the second ECC engine of FIG. 1.

Referring to FIG. 2, a particular embodiment of a system 200 including the on-bus ECC module 108 is depicted. The on-bus ECC module 108 includes the second ECC engine 112, a controller interface 202, and a non-volatile memory interface 204. The controller interface 202 is coupled to the first communication channel 120, illustrated as multiple input/output (I/O) data and/or control lines. The controller interface 202 may further be configured to receive one or more read enable (RE) signals, one or more write enable (WE) signals, one or more chip select (CS) signals, one or more other signals, or any combination thereof. Similarly, the non-volatile memory interface 204 is coupled to the second communication channel 122, illustrated as multiple I/O lines including data lines and/or control lines. The non-volatile memory interface 204 may further be configured to provide one or more read enable, write enable, and/or chip select signals to the non-volatile memory 106 corresponding to signals received via the controller interface 202.

The second ECC engine 112 includes an error detector 210, an error corrector 212, an encoder 214, and a monitor circuit 216. The error detector 210 is configured to perform an error detection operation to determine the number of error bits occurring in data received via the first communication channel 120. The error detector 210 is configured to provide an indication 220 of the number of detected errors to the monitor circuit 216, and provide codewords to error corrector 212 for error correction The monitor circuit 216 may be configured to generate a correction capability selection 222 that is provided to the error corrector 212. For example, the monitor circuit 216 may be configured to receive the indication 220 of the number of errors detected in incoming data from the controller 104 and to select an error correction capability of the decode operation 114 of FIG. 1 (i.e., to select an error correction capability to be applied by the error corrector 212) based on one or more conditions of the first communication channel 120. The selection of error correction capability 222 may be provided to the error corrector 212 to configure the error corrector 212 to apply an ECC decoding scheme corresponding to an anticipated or actual number of errors in incoming data from the controller 104.

The error corrector 212 is configured to receive the correction capability selection 222 and to perform an error correction operation to locate and correct errors occurring in the received codeword. The encoder 214 may be configured to apply an ECC encoding operation to generate an ECC codeword based on corrected data generated by the error corrector 212 to be stored in the non-volatile memory 106.

The monitor circuit 216 may further be configured to select the error correction capability based on one or more conditions that include at least one of an error rate, a data throughput rate, and a latency of the first communication channel 120. For example, the monitor circuit 216 may generate the correction capability selection 222 based on a history of received data and a number of detected errors in the received data, such as an average or largest number of errors in the most recent eight codewords that are received from the controller 104. If few errors are detected in the incoming data from the controller 104, the monitor circuit 216 may select to have a very low, or even no, error correction capability. As a result, a reduced number (or no) parity bits may be used to protect data during transmission from the controller 104 to the ECC engine 112 during data writes (and also for transmission of encoded data from the on-bus ECC module 108 to the controller 104 during data reads), thus enabling a higher data throughput over the first communication channel 120 and/or a lower latency of data transfer.

The encoder 214 may also be configured to be responsive to the correction capability selection 222 of the monitor circuit 216 to adjust a number of ECC parity bits that may be provided for data that is to be transmitted to the controller 104, such as in response to a read operation performed at the non-volatile memory 106. Further, the correction capability selection 222 may be provided to the controller 104 via one of the I/O lines of the first communication channel 120 or via one or more other lines, such as a dedicated line, to indicate to the first ECC engine 110 a correction capability to be applied during encoding and/or decoding of data. As a result, data communication between the controller 104 and the on-bus ECC module 108 may use a reduced ECC correction capability based on channel conditions when channel conditions result in fewer transmission errors, and may use an improved correction capability with additional parity bits when channel conditions result in more transmission errors.

Referring to FIG. 3, a first particular embodiment of a method 300 is depicted. The method 300 may be performed in a data storage device including a non-volatile memory, a controller including a first error correction coding (ECC) engine, and a second ECC engine coupled to the controller and to the non-volatile memory, such as the data storage device 102 of FIG. 1.

The method 300 includes receiving, at the second ECC engine, a representation of a first codeword corresponding to data to be stored at the non-volatile memory, at 302. For example, the representation of the first codeword 132 may be received at the second ECC engine 112 via the first communication channel 120 of FIG. 1.

A decode operation of the representation of the first codeword is initiated at the second ECC engine to correct transmission errors prior to storage of the data in the non-volatile memory, at 304. For example, the decode operation 114 may be initiated at the second ECC engine 112 of FIG. 1 to correct transmission errors prior to storage of the second codeword 134 at the non-volatile memory 106. In a first implementation, the second ECC engine may re-encode the data prior to storage at the non-volatile memory, as described with respect to FIG. 4. In a second implementation, the second ECC engine may generate an error-corrected version of the representation of the first codeword to be stored at the non-volatile memory, as described with respect to FIG. 5.

By correcting transmission errors at the second ECC engine prior to storage at the non-volatile memory, a reduced error correction capability may be implemented at the first ECC engine as compared to systems where an ECC engine in a memory controller encodes using a sufficient number of parity bits to correct transmission errors occurring during transfer to and from a non-volatile memory in addition to correcting errors that may occur during storage at the non-volatile memory.

Referring to FIG. 4, a particular embodiment of a method 400 is depicted. The method 400 may be performed in a data storage device including a non-volatile memory, a controller including a first error correction coding (ECC) engine, and a second ECC engine coupled to the controller and to the non-volatile memory, such as the data storage device 102 of FIG. 1. The second ECC engine may be coupled to the controller via a first communication channel and may be coupled to the non-volatile memory via a second communication channel, such as the first communication channel 120 and the second communication channel 122, respectively, of FIG. 1.

A representation of a first codeword corresponding to data to be stored at the non-volatile memory is received at the second ECC engine, at 402. For example, the representation of the first codeword may be the representation of the first codeword 132 of FIG. 1 that may have one or more transmission errors, such as the transmission error 133.

An error correction capacity of a decode operation may be selected based on one or more conditions of the first communication channel, at 404. The one or more conditions may include at least one of an error rate, a data throughput rate, and a latency of the first communication channel. For example, a number of errors in the received representation of the first codeword 132 may be detected by the error detector 210 of FIG. 2 and a count of the detected errors may be provided to the monitor circuit 216. The monitor circuit 216 may provide the correction capability selection 222 to the error corrector 212 to adjust an error correction capability to be used during a decode operation.

The decode operation of the representation of the first codeword is initiated at the second ECC engine to correct transmission errors prior to storage of the data in the non-volatile memory, at 406. For example, the decode operation may be the decode operation 114 of FIG. 1 and may provide an error correction capability responsive to the correction capability selection 222 of FIG. 2.

An encode operation at the second ECC engine may be initiated to encode the data to generate a second codeword, at 408. To illustrate, the first codeword may be generated according to a first ECC scheme having a first error correction capability and the second codeword may be generated according to a second ECC scheme having a second error correction capability that is greater than the first error correction capability. For example, decoded data generated at the error corrector 212 of FIG. 2 may be provided to the encoder 214. The encoder 214 may encode the decoded data to form the second codeword 134 of FIG. 1. The second codeword 134 may be distinct from the first codeword 132 and may provide a greater error correction capability than the first codeword 132, such as by including a greater number of parity bits.

The second codeword may be sent to the non-volatile memory, at 410. For example, the second codeword 134 of FIG. 1 may be sent to the non-volatile memory 106 via the second communication channel 122 and may be stored in the non-volatile memory 106 for later retrieval.

The method 400 may also include reading data from the non-volatile memory. For example, the method 400 may include receiving, at the second ECC engine, a representation of encoded second data that is read from the non-volatile memory, at 412, and that is provided to the second ECC engine 112 via the second communication channel 122 of FIG. 1.

The representation of the encoded second data may be decoded, at 414. For example, the representation of the encoded second data may be routed to the error corrector 212 of FIG. 2 for decoding according to a second ECC scheme to recover the second data.

The second data may be encoded at the second ECC engine according to the selected error correction capacity and the encoded second data may be sent to the controller, at 416. For example, after the second data is recovered at the error corrector 212 of FIG. 2, the second data may be provided to the encoder 214 to be encoded according to the first ECC scheme for transmission to the controller 104. The first ECC scheme implemented by the encoder 214 may be adaptive to one or more conditions of the first communication channel 120 as determined by the monitor circuit 216.

By using a lower-correction capability ECC scheme for data transfer between the controller and the second ECC engine, a total number of bits transferred between the controller and the second ECC engine may be reduced as compared to providing a higher-correction capability encoding at the controller. By adapting the correction capability to channel conditions, a number of parity bits used to encode data for transmission between the controller and the second ECC engine may be reduced (or possibly eliminated) in response to favorable channel conditions.

Figure 5:
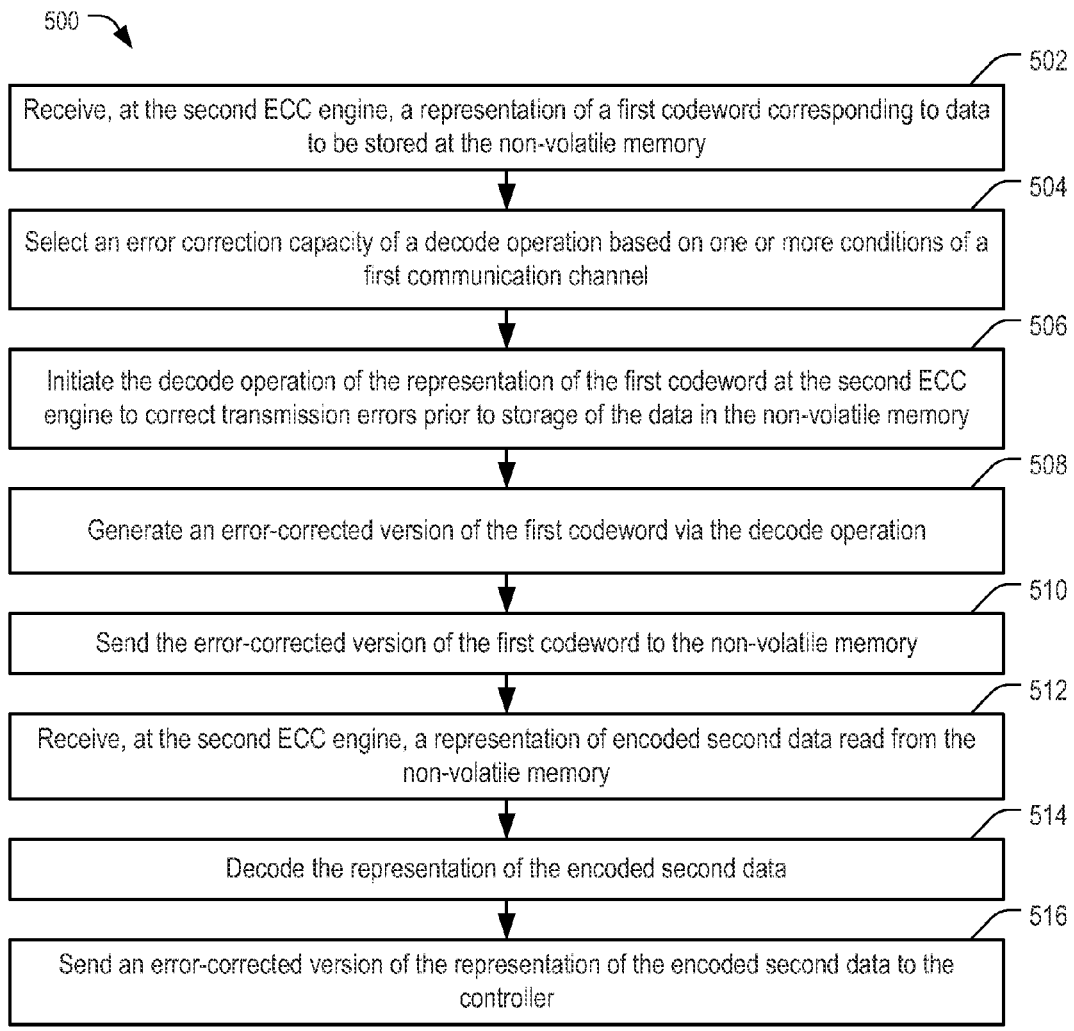
FIG. 5 is a flow chart of a third particular embodiment of operation of the second ECC engine of FIG. 1.

Referring to FIG. 5, a particular embodiment of a method 500 is depicted. The method 500 may be performed in a data storage device including a non-volatile memory, a controller including a first error correction coding (ECC) engine, and a second ECC engine coupled to the controller and to the non-volatile memory, such as the data storage device 102 of FIG. 1. The second ECC engine may be coupled to the controller via a first communication channel and may be coupled to the non-volatile memory via a second communication channel, such as the first communication channel 120 and the second communication channel 122, respectively, of FIG. 1.

The method 500 includes receiving, at the second ECC engine, a representation of a first codeword corresponding to data to be stored at the non-volatile memory, at 502. An error correction capacity of a decode operation may be selected based on one or more conditions of the first communication channel, at 504. The one or more conditions may include at least one of an error rate, a data throughput rate, and a latency of the first communication channel. For example, a number of errors in the received representation of the first codeword 132 may be detected by the error detector 210 of FIG. 2 and a count of the detected errors may be provided to the monitor circuit 216. The monitor circuit 216 may provide the correction capability selection 222 to the error corrector 212 to adjust an error correction capability to be used during a decode operation.

The decode operation of the representation of the first codeword may be initiated at the second ECC engine to correct transmission errors prior to storage of the data in the non-volatile memory, at 506. The second ECC engine may generate an error-corrected version of the first codeword via the decode operation, at 508. For example, the second ECC engine 112 may detect and correct errors in the first codeword 132 without re-encoding the data according to another ECC scheme. The error-corrected version of the first codeword may be sent to the non-volatile memory, at 510.

To illustrate, the first codeword 132 may be generated according to a second ECC scheme having a second correction capability (i.e., sufficient correction capability to correct errors occurring during storage at the non-volatile memory 106). The second ECC engine 112 may be configured to perform the decode operation 114 using a first ECC scheme having a first correction capability that is less than the second correction capability. For example, the first ECC scheme applied during the decode operation 114 may be sufficient to correct a number of errors that may occur during transmission via the first communication channel 120 but may be insufficient to correct a number of errors that may occur during storage at the non-volatile memory 106.

The method 500 may also include reading data from the non-volatile memory. For example, the method 500 may include receiving, at the second ECC engine, a representation of encoded second data that is read from the non-volatile memory, at 512, and that is provided to the second ECC engine 112 via the second communication channel 122 of FIG. 1.

The representation of the encoded second data may be decoded, at 514. For example, the representation of the encoded second data may be decoded by the second ECC engine 112 according to a second ECC scheme to recover the second data. An error-corrected version of the representation of the encoded second data may be sent to the controller, at 516.

In contrast to the method 400 of FIG. 4, the method 500 does not include encoding of data at the second ECC engine. Decoding at the second ECC engine during a data write operation to the non-volatile memory may use the first ECC scheme having a reduced error correction capability to correct a relatively fewer number of errors due to transmission errors, and decoding at the second ECC engine during a data read operation from the non-volatile memory may use the second ECC scheme having an enhanced error correction capability to correct a relatively greater number of errors that may occur during storage at the non-volatile memory.

Although various components depicted herein are illustrated as block components and described in general terms, such components may include one or more microprocessors, state machines, or other circuits configured to enable the second ECC engine 112 of FIG. 1 to decode errors that occur during transmission of the first codeword 132 via the first communication channel 120 and to generate the second codeword 134 for storage in the non-volatile memory 106. For example, the second ECC engine 112 may represent physical components, such as hardware controllers, state machines, logic circuits, or other structures, to enable the second ECC engine 112 of FIG. 1 to receive the representation of the first codeword 132, detect and correct errors in the representation of the first codeword 132, and to re-encode the data to generate the second codeword 134 (in the first implementation) or to provide an error-corrected version of the first codeword 132 as the second codeword 134 (in the second implementation) for storage at the non-volatile memory 106.

The second ECC engine 112 may be implemented using a microprocessor or microcontroller programmed to perform one or more of the first ECC scheme or the second ECC scheme, during decoding or encoding, as described herein. In a particular embodiment, the second ECC engine 112 includes a processor executing instructions that are stored at the non-volatile memory 106. Alternatively, or in addition, executable instructions that are executed by the processor may be stored at a separate memory location that is not part of the non-volatile memory 106, such as at a read-only memory (ROM).

In a particular embodiment, the data storage device 102 may be implemented in a portable device configured to be selectively coupled to one or more external devices. However, in other embodiments, the data storage device 102 may be attached or embedded within one or more host devices, such as within a housing of a host communication device. For example, the data storage device 102 may be within a packaged apparatus such as a wireless telephone, a personal digital assistant (PDA), a gaming device or console, a portable navigation device, or other device that uses internal non-volatile memory. In a particular embodiment, the data storage device 102 may be coupled to a non-volatile memory, such as a three-dimensional (3D) memory, a flash memory (e.g., NAND, NOR, Multi-Level Cell (MLC), a Divided bit-line NOR (DINOR) memory, an AND memory, a high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data storage device comprising:
    a non-volatile memory;
    a controller including a first error correction coding (ECC) engine configured to generate a first codeword corresponding to data to be stored at the non-volatile memory; and
    a second ECC engine coupled to the controller and to the non-volatile memory, wherein the second ECC engine is configured to receive a representation of the first codeword from the controller and to perform a decode operation of the representation of the first codeword to correct transmission errors prior to storage of the data in the non-volatile memory, and wherein the second ECC engine is configured to encode the data after the decode operation to generate a second codeword to be stored in the non-volatile memory, and
    wherein the first codeword is generated according to a first ECC scheme having a first error correction capability and wherein the second codeword is generated according to a second ECC scheme having a second error correction capability that is greater than the first error correction capability.

2. The data storage device of claim 1, wherein the second ECC engine is coupled to the controller via a first communication channel and is coupled to the non-volatile memory via a second communication channel, and further comprising a monitor circuit configured to select an error correction capacity of the decode operation based on one or more conditions of the first communication channel.

3. The data storage device of claim 2, wherein the one or more conditions includes at least one of an error rate, a data throughput rate, or a latency of the first communication channel.

4. The data storage device of claim 2, wherein the second ECC engine is further configured to receive and decode a representation of encoded second data read from the non-volatile memory.

5. The data storage device of claim 4, wherein the second ECC engine is further configured to encode the second data according to the selected error correction capacity.

6. The data storage device of claim 4, wherein the second ECC engine is configured to generate an error-corrected version of the representation of the encoded second data to be sent to the controller.

7. A method comprising:
    in a data storage device including a non-volatile memory, a controller including a first error correction coding (ECC) engine, and a second ECC engine coupled to the controller and to the non-volatile memory, performing:
        receiving, at the second ECC engine, a representation of a first codeword corresponding to data to be stored at the non-volatile memory;
        initiating a decode operation of the representation of the first codeword at the second ECC engine to correct transmission errors prior to storage of the data in the non-volatile memory;
        initiating an encode operation at the second ECC engine to encode the data to generate a second codeword, wherein the first codeword is generated according to a first ECC scheme having a first error correction capability and wherein the second codeword is generated according to a second ECC scheme having a second error correction capability that is greater than the first error correction capability; and
        sending the second codeword to the non-volatile memory.

8. The method of claim 7, wherein the second ECC engine generates an error-corrected version of the first codeword via the decode operation, and further comprising sending the error-corrected version of the first codeword to the non-volatile memory.

9. The method of claim 7, wherein the second ECC engine is coupled to the controller via a first communication channel and is coupled to the non-volatile memory via a second communication channel, and further comprising selecting an error correction capacity of the decode operation based on one or more conditions of the first communication channel.

10. The method of claim 9, wherein the one or more conditions includes at least one of an error rate, a data throughput rate, or a latency of the first communication channel.

11. The method of claim 9, further comprising:
    receiving, at the second ECC engine, a representation of encoded second data read from the non-volatile memory; and
    decoding the representation of the encoded second data.

12. The method of claim 11, further comprising encoding the second data at the second ECC engine according to the selected error correction capacity and sending the encoded second data to the controller.

13. The method of claim 11, further comprising sending an error-corrected version of the representation of the encoded second data to the controller.

14. A data storage device comprising:
a non-volatile memory;
a controller including a first error correction coding (ECC) engine configured to generate a first codeword corresponding to data to be stored at the non-volatile memory;
a second ECC engine coupled to the controller and to the non-volatile memory, wherein the second ECC engine is configured to receive a representation of the first codeword from the controller and to perform a decode operation of the representation of the first codeword to correct transmission errors prior to storage of the data in the non-volatile memory, wherein the second ECC engine is coupled to the controller via a first communication channel and is coupled to the non-volatile memory via a second communication channel; and
a monitor circuit configured to select an error correction capacity of the decode operation based on one or more conditions of the first communication channel.

15. The data storage device of claim 14, wherein the one or more conditions includes at least one of an error rate, a data throughput rate, or a latency of the first communication channel.

16. The data storage device of claim 14, wherein the second ECC engine is further configured to receive and decode a representation of encoded second data read from the non-volatile memory.

17. The data storage device of claim 16, wherein the second ECC engine is further configured to encode the second data according to the selected error correction capacity.

18. The data storage device of claim 16, wherein the second ECC engine is configured to generate an error-corrected version of the representation of the encoded second data to be sent to the controller.

19. A data storage device comprising:
a non-volatile memory;
a controller including a first error correction coding (ECC) engine configured to generate a first codeword corresponding to data to be stored at the non-volatile memory; and
a second ECC engine coupled to the controller and to the non-volatile memory, wherein the second ECC engine is configured to receive a representation of the first codeword from the controller and to perform a decode operation of the representation of the first codeword to correct transmission errors prior to storage of the data in the non-volatile memory, wherein the second ECC engine is configured to generate an error-corrected version of the first codeword via the decode operation to be stored in the non-volatile memory, wherein the first codeword is generated according to a second ECC scheme having a second error correction capability, and wherein the second ECC engine is configured to perform the decode operation using a first ECC scheme having a first error correction capability that is less than the second error correction capability.

20. The data storage device of claim 19, wherein the second ECC engine is coupled to the controller via a first communication channel and is coupled to the non-volatile memory via a second communication channel, and further comprising a monitor circuit configured to select an error correction capacity of the decode operation based on one or more conditions of the first communication channel.

21. The data storage device of claim 20, wherein the one or more conditions includes at least one of an error rate, a data throughput rate, or a latency of the first communication channel.

* * * * *